3,226,413
STABILIZATION OF ORGANIC ISOCYANATES
WITH HYDRAZINE COMPOUNDS
Eric Smith, New Haven, Conn., assignor to Olin Mathieson Chemical Corporation, a corporation of Virginia
No Drawing. Filed Mar. 20, 1963, Ser. No. 266,480
12 Claims. (Cl. 260—453)

This invention relates to organic isocyanate compounds stabilized against discoloring, and to the process for preparing them.

Organic isocyanates have been used extensively as a reactant in processes for the preparation of polyurethane surface coatings and the like. One problem encountered in such processes is that organic isocyanates, such as toluene diisocyanate, become discolored when stored for extended periods prior to use. The normally colorless isocyanate develops a deep yellow color after extended storage periods. Such discolored organic isocyanates are undesirable because they impart an undesirable yellow color to the resulting polyurethane surface coating. Various additives have been employed to stabilize the organic isocyanates against discoloring. However, in general, these additives are either too expensive because large proportions of the additives are required to effect the desired degree of stabilization, or else the additives are not effective for extended periods of storage.

It is a primary object of this invention to provide organic isocyanate compositions stabilized against discoloring.

Another object of the invention is to provide toluene diisocyanate compositions stabilized against discoloring.

A further object of the invention is to provide a process for stabilizing organic isocyanates against discoloring.

It is another object of the invention to provide a process for stabilizing toluene diisocyanate against discoloring.

These and other objects of the invention which overcome the disadvantages of the prior art will be apparent from the following detailed description of the invention.

It has now been discovered that the aforesaid objects can be accomplished when an organic isocyanate is admixed with a stabilizing proportion of a substituted hydrazine compound selected from the group consisting of substituted hydrazine having the formula (I) 

where R is selected from the group consisting of alkyl radicals containing between about 1 and 10 carbon atoms,

and

where Ph is a phenyl group; dialkyl substituted hydrazines of the formula (II) 

where R' is an alkyl radical containing between about 1 and about 10 carbon atoms; and hydrazones of the formula (III) 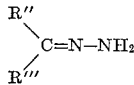

where R" is selected from the group consisting of an alkyl radical and phenyl radical, and where R''' is selected from the group consisting of hydrogen, an alkyl radical, and phenyl radical, the total number of carbon atoms in R" and R''' being between about 1 and about 20.

More in detail suitable substituted hydrazines represented by Formula I above includes methyl hydrazine, ethyl hydrazine, propyl hydrazine, butyl hydrazine, n-texyl hydrazine and hydrazides such as benzhydrazide and acethydrazide. Hydrazides of aliphatic mono- and dicarboxylic acids containing between about 3 and about 10 carbon atoms may also be useful.

Compounds represented by Formula II above which have been found to be suitable color stabilizers in accordance with the technique of this invention include the unsymmetrical dialkyl substituted hydrazines such as 1,1-dimethyl hydrazine, 1,1-diethyl hydrazine, 1,1-dibutyl hydrazine, and 1,1-dihexyl hydrazine.

Compounds represented by Formula III above which are found to be suitable for use as color stabilizers for this process include benzylidene hydrazone, ethylidene hydrazone, isopropylidene hydrazone, n-decylidene hydrazone, heneicocylidene hydrazone and the like.

In addition to the aforesaid compounds, salts of hydrazine such as the hydrochloride salt, the phosphite salt, salts of 1,1-dimethyl hydrazine and the like may be employed advantageously.

Sufficient susbtituted hydrazine of the type discussed above is added to the organic isocyanate to stabilize it against discoloring. The stabilizing proportion is generally between about 10 and 2000 parts, and preferably between about 25 and about 1500 parts per million by weight of the organic isocyanate. However, any proportion of the substituted hydrazine capable of effecting stabilization without adversely diluting the organic stabilizer may be employed.

Liquid substituted hydrazines in the above mentioned groups are readily admixed with liquid organic isocyanate simply by agitating the stabilizing proportion of the substituted hydrazine in the organic isocyanate. When either the substituted hydrazine or the organic isocyanate are solids, they are heated to effect melting thereof and then admixed together in a liquid state.

Typical examples of organic isocyanates which can be stabilized in accordance with the techinque of this invention include 2,4-toluene diisocyanate, 2,6-toluene diisocyanate, 4,4'-methylenediphenylisocyanate, 4,4'-methylenedi-ortho-tolylisocyanate, 2,4,4' - triisocyanatodiphenylether, toluene - 2,4,6 - triisocyanate, 1-methoxy-2,4,6-benzenetriisocyanate, meta-phenylenediisocyanate, 4-chloro-meta - phenylenediisocyanate, 4,4' - biphenyldiisocyanate, 1,5-naphthalenediisocyanate, 1,4 - tetramethylenediisocyanate, 1,6-hexamethylenediisocyanate, 1,10-decamethylenediisocyanate, 1,4 - cyclohexanediisocyanate, 4,4' - methylene-bis(cyclohexylisocyanate), 1,5-tetrahydronaphthalenediisocyanate, ortho-, meta- or para-tolueneisocyanate, alpha- and beta-naphthyleneisocyanate, 4-methoxy-meta-phenylenediisocyanate, and the like.

Organic isocyanate stabilized in accordance with the technique of this invention can be stored for several months without appreciable discoloring.

The following examples are presented to further illustrate the invention without any intention of being limited thereby. All parts and percentages are by weight unless otherwise specified.

*Examples I-IV*

Seven vials having a capacity of 16 milliliters were employed in carrying out these examples. The vials were cleaned, dried and the screw caps were lined with aluminum foil. Each vial was filled with 10 milliliters (12.2 grams) of colorless toluene diisocyanate which contained 80 percent 2,4-toluene diisocyanate and 20 percent 2,6-toluene diisocyanate. To each of four vials was added one substituted hydrazine stabilizer compound in the proportion indication below in the table. No substituted hydrazine was added to three of the vials. After securing the caps to the vials they were allowed to stand at room temperature for the period indicated in the table. The table also sets forth the color of the sample obtained after storage.

| Example | Stabilizer | Proportion Of Stabilizer, Grams | Storage Period, Days | Appearance After Storage Period |
|---|---|---|---|---|
| I | Dimethyl hydrazine | 0.0093 | 35 | Slightly discolored. |
| II | Benzylidene hydrazone | 0.0158 | 35 | Colorless. |
| III | Benzhydrazide | 0.0124 | 28 | Colorless. |
| IV | Acethydrazide | 0.0122 | 26 | Slightly discolored. |

For purposes of comparison, the three vials to which no substituted hydrazine stabilizer had been added were all discolored with a yellow color after standing 2½ days.

*Examples V–VI*

To determine the effectiveness of substituted hydrazine as a stabilizer for toluene diisocyanate in the presence of fluorescent light, two samples of toluene diisocyanate containing benzhydrazide were stored in 8-ounce clear bottles under fluorescent light at a distance of about 8 feet from the light source for a period of about 80 days. The bottles were shielded against sunlight so that the effect of the fluorescent light could be established. In Example V, the concentration of benzhydrazide was 400 parts per million and in Example VI the concentration of benzhydrazide was 50 parts per million.

After storing the samples for about 80 days, the color was determined in accordance with the procedure set forth in ASTM D1638–61T wherein the color is compared with various concentrations of aqueous solutions of potassium chloroplatinate. In this method aqueous solutions of various concentrations of a standard solution prepared from potassium chloroplatinate, hydrochloric acid, cobaltous chloride, and water are prepared, the lower number represented the lower concentration of the standard solution. The sample to be measured is then compared with the various standard solutions. The bottle which contained benzhyrazide in a concentration of 400 parts per million had a color number of less than 15 while the bottle which had the benzhydrazide of 50 parts per million had a color number of 15. For purposes of comparison a control sample which contained no benzhydrazide was stored under the same conditions and was found to have a color number of about 35.

Various modifications of the invention may be employed without departing from the spirit of the invention.

I claim:

1. An organic isocyanate containing a stabilizing proportion of a substituted hydrazine selected from the group consisting of substituted hydrazines having the formula

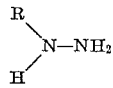

where R is selected from the group consisting of alkyl radicals containing between 1 and 10 carbon atoms,

and

where Ph is a phenyl group; dialkyl substituted hydrazines of the formula

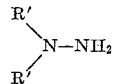

where R' is an alkyl radical containing between 1 and 10 carbon atoms; and hydrazones of the formula

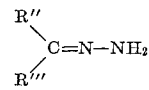

where R" is selected from the group consisting of an alkyl radical and phenyl radical and R''' is selected from the group consisting of hydrogen, and alkyl radical, and phenyl radical, the total number of carbon atoms in R" and R''' being between 1 and 20.

2. The composition of claim 1 wherein the stabilizing proportion of said substiuted hydrazine is between about 10 and 2000 parts per million by weight.

3. The composition of claim 1 wherein the stabilizing proportion of said substituted hydrazine is between about 25 and 1500 parts per million by weight.

4. The composition of claim 1 wherein said substituted hydrazine is benzhydrazide.

5. The composition of claim 1 wherein said substituted hydrazine is acethydrazide.

6. The composition of claim 1 wherein said substituted hydrazine is 1,1-dimethylhydrazine.

7. The composition of claim 1 wherein said substituted hydrazine is benzylidene hydrazone.

8. Toluene diisocyanate stabilized against discoloring comprised of toluene diisocyanate containing a stabilizing proportion of substituted hydrazine selected from the group consisting of substituted hydrazines having the formula

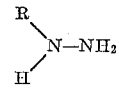

where R is selected from the group consisting of alkyl radicals containing between 1 and 10 carbon atoms,

and

where Ph is a phenyl group; dialkyl substituted hydrazines of the formula

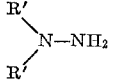

where R' is an alkyl radical containing between 1 and 10 carbon atoms; and hydrazones of the formula

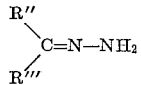

where R" is selected from the group consisting of an alkyl radical and phenyl radical, and where R''' is selected from the group consisting of hydrogen, an alkyl radical and phenyl radical, the total number of carbon atoms in R" and R''' being between 1 and 20.

9. The toluene diisocyanate of claim 8 wherein said substituted hydrazine is benzhydrazide.

10. The toluene diisocyanate of claim 8 wherein said substituted hydrazine is acethydrazide.

11. The toluene diisocyanate of claim 8 wherein said substituted hydrazine is 1,1-dimethylhydrazine.

12. The toluene diisocyanate of claim 8 wherein said substituted hydrazine is benzylidene hydrazone.

References Cited by the Examiner
UNITED STATES PATENTS

| | | | |
|---|---|---|---|
| 2,129,132 | 9/1938 | Hunter | 252—300 |
| 2,748,021 | 5/1956 | VanAllan | 252—300 X |
| 2,763,566 | 9/1956 | VanAllan | 252—300 X |

CHARLES B. PARKER, *Primary Examiner.*